United States Patent [19]
Miyagawa et al.

[11] Patent Number: 5,835,479
[45] Date of Patent: *Nov. 10, 1998

[54] OPTICAL INFORMATION RECORDING MEDIUM

[75] Inventors: Naoyasu Miyagawa, Kawanishi; Yoshito Aoki, Moriguchi; Takashi Ishida, Yawata; Shunji Ohara, Higashiosaka, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 727,307

[22] Filed: Oct. 8, 1996

[30] Foreign Application Priority Data

Oct. 9, 1995 [JP] Japan ................................. 7-261243
Feb. 7, 1996 [JP] Japan ................................. 8-020851

[51] Int. Cl.$^6$ .................................................. G11B 7/24
[52] U.S. Cl. ................................... 369/275.2; 369/275.3
[58] Field of Search ................... 369/275.1, 275.2, 369/275.3, 275.4, 32, 13

[56] References Cited

U.S. PATENT DOCUMENTS

| | | | |
|---|---|---|---|
| 5,214,627 | 5/1993 | Nakashima et al. | 369/32 |
| 5,247,494 | 9/1993 | Ohno et al. | 369/13 |
| 5,448,552 | 9/1995 | Onagi | 369/275.3 |
| 5,493,552 | 2/1996 | Kobori | 369/275.4 |
| 5,517,485 | 5/1996 | Nishiuchi et al. | 369/275.3 |
| 5,602,823 | 2/1997 | Aoki et al. | 369/275.3 |

FOREIGN PATENT DOCUMENTS

| | | |
|---|---|---|
| 439 196 | 7/1991 | European Pat. Off. . |
| 570 235 | 11/1993 | European Pat. Off. . |
| 588 305 | 3/1994 | European Pat. Off. . |
| 5-54386 | 3/1993 | Japan . |
| 7 029186 | 11/1993 | Japan . |
| 8-22640 | 1/1996 | Japan . |

*Primary Examiner*—Nabil Hindi
*Attorney, Agent, or Firm*—Wenderoth, Lind & Ponack, L.L.P.

[57] ABSTRACT

A read-only zone or control zone is formed in an optical information recording medium wherein information signal are formed in both grooves and lands. Grooves are not formed in the control zone or read-only zone, and read-only data such as control data, audio-video data, or computer data is pre-recorded as a sequence of pre-formed pits on the track center line. The track pitch of the pre-formed pit sequences in the control zone or read-only zone is equal to the groove pitch in the read-write zones.

3 Claims, 9 Drawing Sheets

OPTICAL INFORMATION RECORDING MEDIUM

BACKGROUND OF THE INVENTION

1. Field of the Invention

The present invention relates to an optical information recording medium wherein both grooves pre-formed on the optical disk medium and the lands existing between the grooves are used as data tracks.

2. Description of Related Art

A wide range of optical disks capable of recording and reproducing information signals, including audio and video information signals, have been developed in recent years. In particular, read-write disk have data tracks preformed by cutting guide channels (grooves) into the optical disk substrate. The space between these grooves is known as a "land." Information signals are recorded and reproduced by focusing a laser beam on the flat part of the grooves or lands. These information signal can be recorded by the user, and are therefore commonly referred to as "user data."

On most commercially available optical disks, the information signal is recorded only on either the grooves or the lands with the other (the one not used for user data) used by the system as a guard band for separating adjacent tracks. An identification signal expressing location information (address information) on the disk and other system control information is usually pre-recorded to the disk.

A technology for increasing the track density by recording information signals to both the grooves and lands has been proposed as a means of increasing the optical disk recording capacity. This technology is disclosed in, for example, Japanese Patent Publication (examined) No. 63-57859.

An enlarged section of this type of optical disk is shown in FIG. 9. Shown in FIG. 9 are a recording layer 101, recording pits 102, a beam spot 103 focused by an objective lens or other means, a transparent substrate 109 made of polycarbonate resin or other material, lands 111, 113, and 115, and grooves 112 and 114. As shown in the figure, the grooves and lands are of approximately equal width. A sequence of pre-formed pits 116 is formed in the beginning of each sector, and the pits are used to record the identification signal indicating location information on the optical disk.

The grooves 112 and 114 and the pre-formed pits 116 are formed when the transparent substrate 109 is manufactured by, for example, an injection molding process that creates recesses of the grooves and pits and thus leaves the lands between the grooves and pits. As shown in FIG. 9, the recording pits 102 are formed on both the grooves and lands, and it is therefore possible to double the optical disk recording capacity compared with recording on only the grooves or lands.

An area to which control information is pre-recorded using, a sequence of pits is also generally provided separately from the area (the "user data recording zone") to which user data is recorded (see ISO/IEC 13963, section 17.2.4). This control information area is commonly provided at, for example, the inside circumference of the disk, and is called the "control zone." The control information includes media characteristics data such as the disk type, reflectance, the recommended optical beam power, recommended recording pulse width, and other drive control data used for recording user data.

This control information is used by an apparatus in which the optical disk is mounted to automatically compensate for differences in optical disk types and media characteristics resulting from differences between manufacturers. The control information thus helps improve the utility and ease of use of individual recording/reproducing apparatuses.

In optical disks in which both grooves and lands are used as data tracks, however, read-write zones and read-only zones are not both formed in the data recording zone.

In addition, if the track pitch of the pit sequence representing the identification signal and the pit sequence written to the control zone are the same as the track pitch in the read-write zone, highly accurate injection molding technologies are required because the distance between pit sequences in the radial direction of the disk is half the groove pitch. As a result, manufacturing the transparent substrate of the disk is technically difficult.

SUMMARY OF THE INVENTION

The present invention has been developed to overcome the abovedescribed disadvantages.

It is accordingly an objective of the present invention to provide an optical information recording medium in which the recording capacity is doubled by using both grooves and lands as information tracks, and to particularly provide such an optical information recording medium in which both read-write and read-only zones are provided in the data recording zone.

Another objective of the present invention is to provide an optical information recording medium for which the transparent substrate can be easily manufactured to comprise, by means of pit sequences, a control zone containing pre-recorded control information or a read-only zone containing pre-recorded audio-video data or other information.

In accomplishing the above and other objectives, the optical information recording medium according to the present invention comprises a substrate having grooves and lands both formed thereon, at least one recording film formed on the substrate and having data tracks formed in a spiral or concentric pattern, a read-write zone in which user data is recorded to both the grooves and lands, and a read-only zone having pit sequences formed on either the inside circumference or outside circumference of the read-write zone.

It is preferred that the pit sequences are formed at the same pitch as the grooves in the read-write zone in a radial direction of the substrate.

It is also preferred that the difference between the radial position of a selected data track in the read-only zone, and the radial position of a selected data track in the read-write zone, is equal to an integer which is a multiple of the groove pitch.

Advantageously, the data tracks are divided into plural sectors comprising an identification signal area and a data area. In the identification signal area, the radial interval between the pit sequences is equal to the groove pitch, and the pit sequences are formed offset to an inside circumference or outside circumference of the grooves from a track center line.

When the data tracks are formed in the spiral pattern, it is preferred that the pit sequences in the read-only zone are arrayed continuously to the grooves of the read-write zone at a border between the read-write zone and the read-only zone.

When the data tracks are formed in the concentric pattern, it is preferred that the radial interval between the grooves of the read-write zone and the pit sequences of the adjacent read-only zone is equal to the groove pitch.

BRIEF DESCRIPTION OF THE DRAWINGS

The above and other objectives and features of the present invention will become more apparent from the following description of preferred embodiments thereof with reference to the accompanying drawings, throughout in which like parts are designated by like reference numerals, and wherein.

DETAILED DESCRIPTION OF THE PREFERRED EMBODIMENTS

Embodiment 1

An optical disk according to the first embodiment of the present invention is described below using, as the recording material of the disk, a phase-change type read-write material to which data can be recorded by changing the reflectance of the material.

Figure 1:
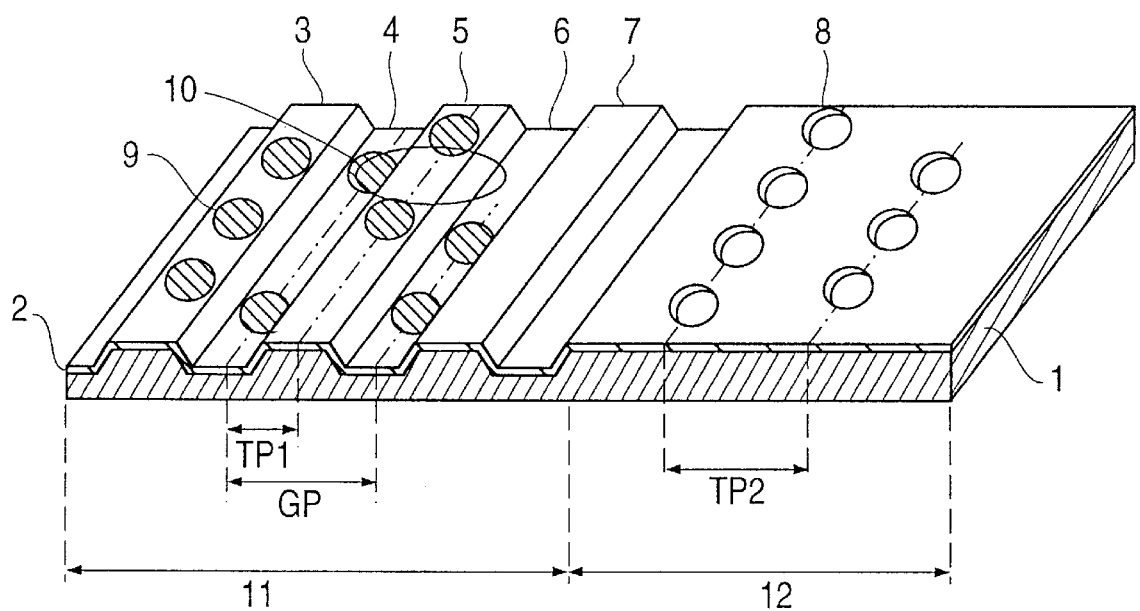
FIG. 1 is an enlarged fragmentary perspective view of an optical disk according to a first embodiment of the present invention.

FIG. 1 is an enlarged fragmentary perspective view of an optical disk according to the present embodiment. As shown in FIG. 1, this optical disk comprises a transparent substrate 1 made of polycarbonate resin or other material, a recording layer 2 comprising one or more recording films covering the transparent substrate 1, lands 3, 5, and 7, and grooves 4 and 6. The grooves and lands are of approximately equal width as shown in the figure. The transparent substrate 1 has a plurality of pre-formed pits 8 and a plurality of recording pits 9 formed amorphously according to the user data. A beam spot 10 is used for recording and reproduction. The optical disk shown in FIG. 1 has a read-write zone 11 and a control zone 12 adjoining the read-write zone 11. The read-write zone 11 enables user data to be written to both the grooves and lands. The control zone 12 contains pre-recorded control information including media characteristics data and drive control data.

The grooves 4 and 6 generally have a depth ranging from approximately $\lambda/10$ to approximately $\lambda/4$ in optical length (where $\lambda$ is the wavelength of the read laser light). A groove depth between approximately $\lambda/7$ to $\lambda/5$ is preferred because crosstalk from the adjacent track can thereby be reduced (see Japanese Laid-open Patent (unexamined) No. 5-282705). The pre-formed pits 8 have the same depth as the grooves.

In FIG. 1, the track pitch TP1 of the data tracks in the read-write zone 11 is half the groove pitch GP. The track pitch TP2 of the data tracks in the control zone 12 is equal to the groove pitch GP.

Figure 2:
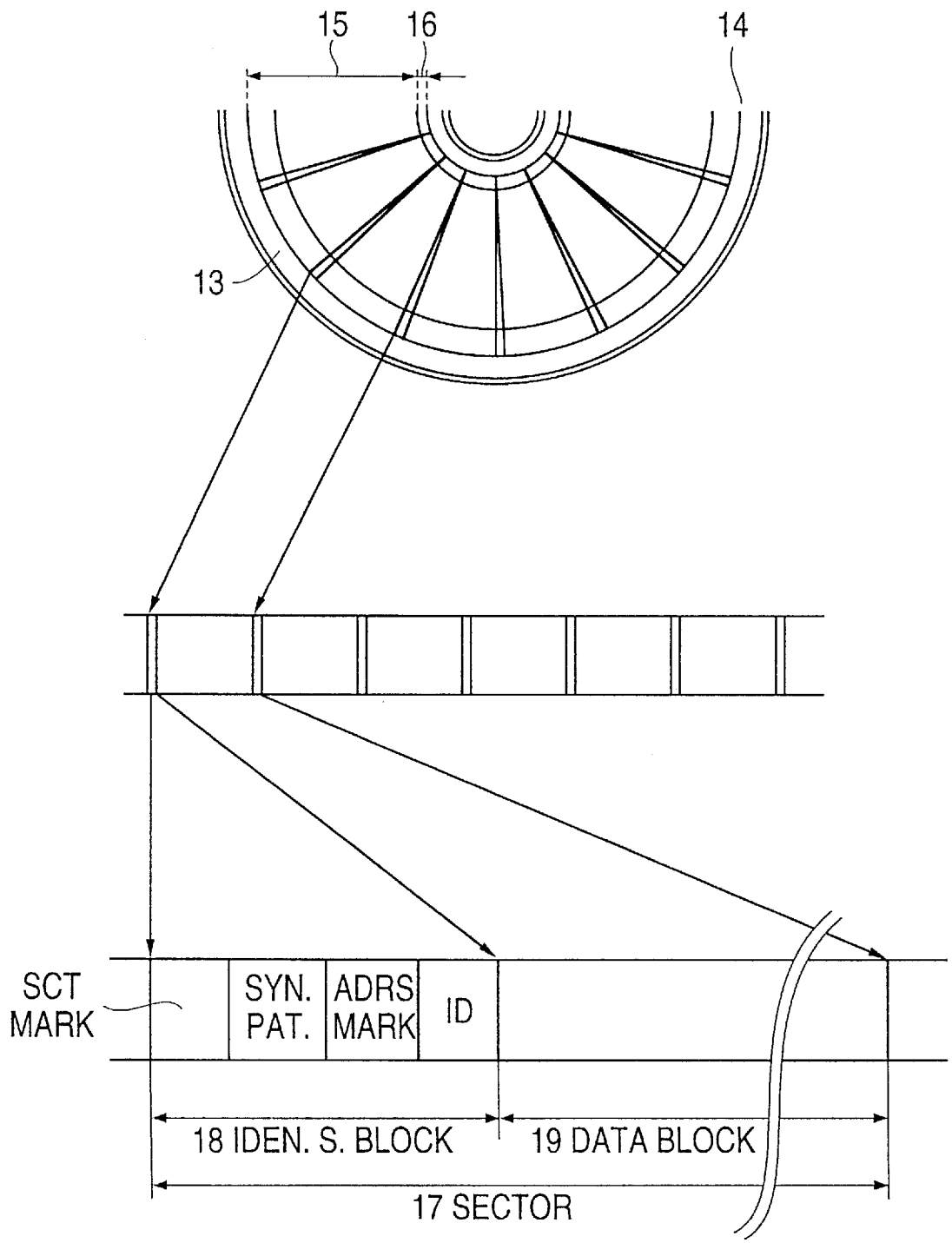
FIG. 2 is a format diagram used to explain the sector format of the optical disk of FIG. 1.

FIG. 2 depicts the sector format of an optical disk 13 embodying the present invention. The optical disk 13 has a plurality of data tracks 14 formed from sequences of grooves, lands, or pre-formed pits formed in a spiral pattern on the transparent substrate. The optical disk 13 also has a circular read-write zone 15 and a control zone 16 formed radially inwardly of and adjacent to the read-write zone 15.

Each data track is divided into plural sectors 17. Each sector 17 comprises an identification signal block 18 and a data block 19. Each identification signal block 18 contains various fields, including a sector marker, synchronization pattern, address marker, and ID. These fields perform the following functions:

1) Sector marker: identifies the beginning of each sector;
2) Synchronization pattern: produces the clock for address data reproduction;
3) Address marker: identifies the beginning of the address data; and
4) ID: provides the address data.

For compatibility with constant angular velocity (CAV) drive control, the identification signal blocks are aligned in the radial direction of the disk.

It is also possible to group plural tracks to form circular bands, thus dividing the entire disk into plural bands each having plural tracks, and apply CAV control using a different angular velocity in each band. It is also possible to set the angular velocity so as to maintain a constant average linear velocity within each band and reduce, from outside to inside circumference, the number of sectors per disk revolution in each band, thereby achieving the same bit capacity in each sector with a substantially constant linear recording density. This control technique is called modified constant linear velocity (MCLV) control, and is described in detail in, for example, "Optical Disk Technology," (Onoe, et al., Radio Techniques Co., 1989; pp. 222–223). Note that the number of sectors per disk revolution in the control zone 16 is equal to the number of sectors per disk revolution of the adjacent band in the read-write zone 15.

Figure 3:
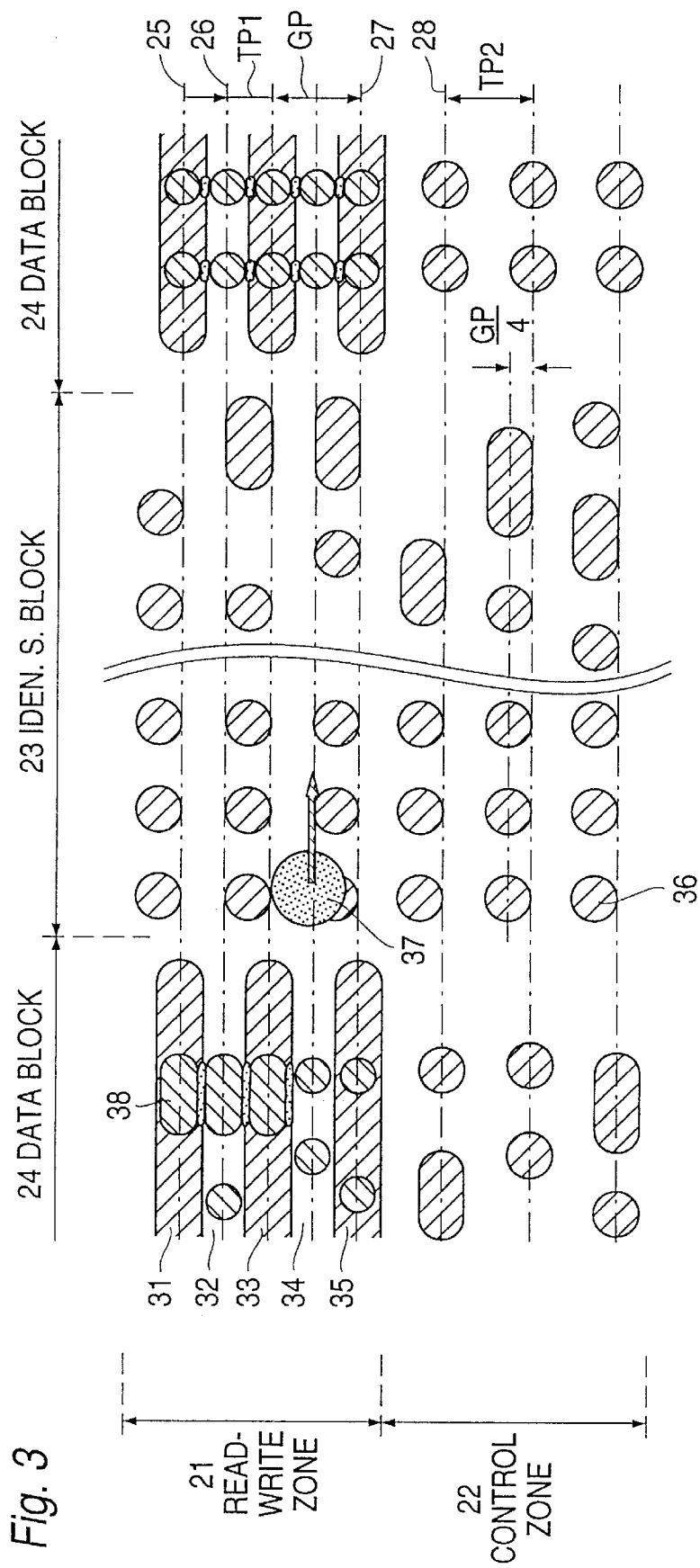
FIG. 3 is an enlarged plan view of the major parts of the optical disk of FIG. 1.

FIG. 3 is an enlarged plan view of the major parts of an optical disk according to the present embodiment having a read-write zone 21 and a control zone 22.

The read-write zone 21 is described first.

The data tracks are formed as alternating grooves 31, 33, and 35 and lands 32 and 34.

No grooves are formed in an identification signal block 23 in the read-write zone 21, and a plurality of pre-formed pits 36 representing the identification signal are offset approximately ¼ groove pitch GP (=GP/4) in the radial direction from the center of the data track, i.e., at every other track between groove center lines 25 and land center lines 26. Note that the tracks include both grooves and lands, and the track pitch TP1 is therefore half of the groove pitch GP (=GP/2).

The identification signal is the optical disk identification signal declaring the track and/or sector address information on the optical disk, the sector markers, reference synchronization signal, or other disk control information.

By thus forming the pre-formed pits 36, representing the identification signal, every other track between the groove track center lines 25 and land track center lines 26, part of the beam spot 37 will pass over the pre-formed pits 36 in the identification signal block 23 whether the beam spot 37 is tracking grooves or lands. As a result, the reflected light is modulated by the pre-formed pits 36, and the address information can be detected whether tracking a groove or land.

Data blocks 24 are where amorphous recording pits (marks) 38 are formed according to the video, audio, computer data, or other user data recorded.

The control zone 22 is described next.

The identification signal block 23 of the control zone 22 is identical to that of the read-write zone 21.

However, grooves are not formed on the data block 24 of the control zone 22, and control information is prerecorded as pre-formed pits on the center line 28 of the track.

As in the conventional optical disk, the control information includes media characteristics data such as the disk type reflectance, the recommended optical beam power, recommended recording pulse width, and other drive control data for recording user data. The track pitch TP2 of the pre-formed pits in the control zone 22 is equal to the groove pitch GP in the read-write zone 21.

The distance between the center lines 27 and 28 of the data tracks adjacent to the border between the read-write zone 21 and the control zone 22 is also equal to the groove pitch GP. The pit sequence in the control zone 22 is thus aligned contiguously to an extension of the spiral trace formed by the center line of grooves in the read-write zone 21 because the data tracks are formed in a spiral pattern on the optical disk according to the present embodiment.

A certain tolerance is thus achieved in the spacing between the pre-formed pit tracks, and the molding of the transparent substrate of the disk is made simpler because the track pitch of the data tracks formed by the pre-formed pits in the data block 24 of the control zone 22 is the wide groove pitch GP and not the narrow track pitch of the data tracks in the read-write zone 21. The crosstalk from pre-formed pits on adjacent tracks is small such that control information read precision is also improved when the control information is reproduced by tracing the control zone 22 with the beam spot 37.

Moreover, because the distance between the center lines 27 and 28 of the data tracks which touch the boundary between the read-write zone 21 and the control zone 22 is equal to the groove pitch GP, the grooves in the read-write zone 21 and the pit sequence in the control zone 22 are arrayed at the same groove pitch GP in the radial direction. The feed pitch of the exposure laser can therefore be kept constant in the master disk cutting process during the manufacturing of the transparent substrates for the disks. As a results, increasing the complexity of disk manufacturing can be avoided.

Address information can also be obtained whether tracing a groove or a land in the identification signal block 23 of the read-write zone 21 because the distance in the radial direction between the pit sequences is equal to the groove pitch GP, and the pit sequence is formed offset approximately ¼ groove pitch (=GP/4) from the track center line 25 toward the inside or outside circumference. Because the pre-formed pit sequences are likewise formed in the identification signal block 23 of the control zone 22, detecting the identification signal block 23 can be accomplished in both zones using the same detection circuitry.

It should be noted that while the information area of the optical disk 13 shown in FIG. 2 has been described as including the read-write zone 15 and the control zone 16, other zones may be added as required. For example, a recording test zone formed with a groove to the inside circumference of the control zone may be provided, and a second control zone may be provided on the outside of the read-write zone 15.

Furthermore, while the present invention has been described using a phase change material for the recording layer material, the present invention shall not be so limited and is applicable to any optical disk in which both grooves and lands are used as information tracks. For example, the present invention can also be applied to magneto-optical disks using the magnetic super-resolution effect. Further, while the depth of the pre-formed pits in the above embodiment has been described as being equal to the groove depth, the pit depth may differ from the groove depth. In particular, if the pit depth is set to $\lambda/4$, the beam spot diffraction is increased with the outstanding effect of increasing modulation of the identification signal.

Furthermore, while the pre-formed pits 36 representing the identification signal are offset approximately ¼ groove pitch GP (=GP/4) in the radial direction from the center of the data track in the present embodiment, tests have demonstrated that the pre-formed pits 36 can be detected by the beam spot 37 when the pre-formed pits 36 are formed offset a further 1/16 groove pitch GP in the radial direction from the ¼ groove pitch GP offset position in the radial direction (i.e., center of groove center line 25 and land center line 26). In other words, the pre-formed pits 36 representing the identification signal can be formed offset from 3/16 to 5/16 groove pitch GP from the center line of the data track.

Embodiment 2

An optical disk according to the second embodiment of the present invention is described below with reference to FIG. 4.

Figure 4:
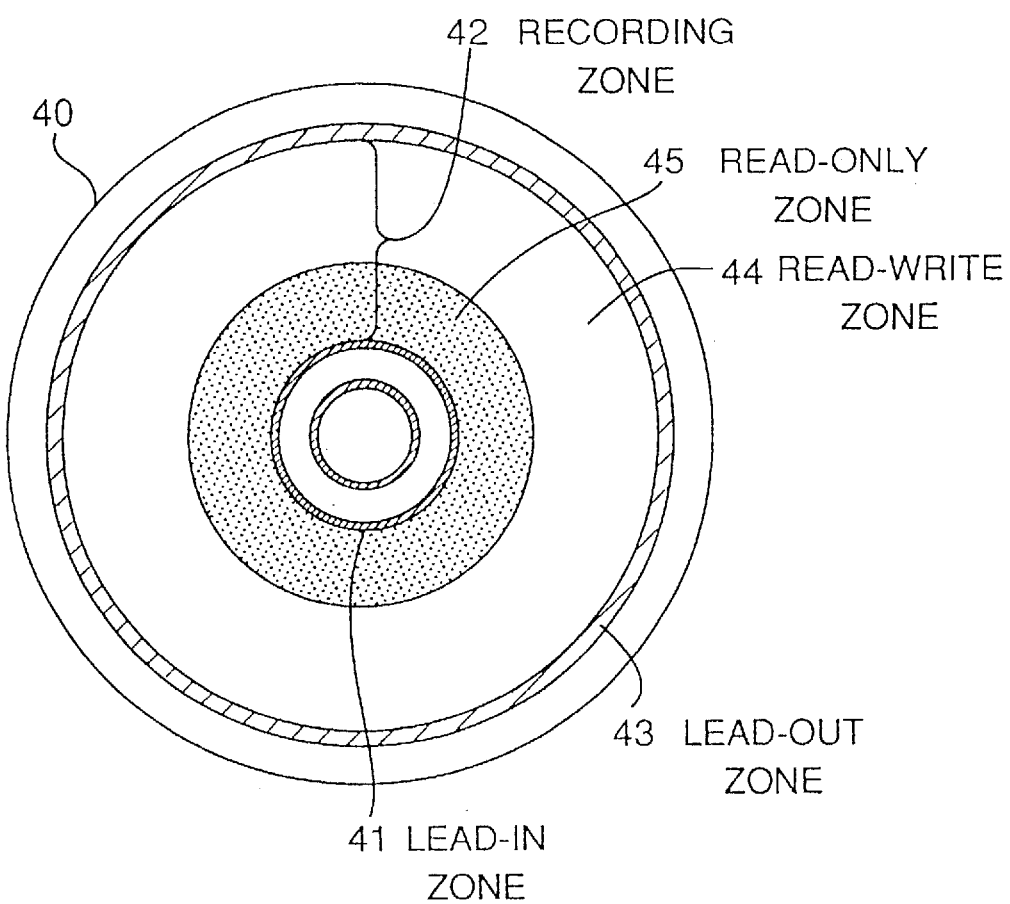
FIG. 4 is a plan view of an optical disk according to a second embodiment of the present invention.

As shown in FIG. 4, an optical disk 40 according to this embodiment comprises a lead-in zone 41, a data recording zone 42, and a lead-out zone 43. The data recording zone 42 further comprises a read-write zone 44 and a read-only zone 45. The control zone or other zone formed from the pre-formed pits as described in the first embodiment above is disposed in the lead-in zone 41 and lead-out zone 43.

Digitized audio-video data, computer data, or other user data is stored in the data recording zone 42. While grooves and lands are formed in the read-write zone 44, only pre-formed pit sequences are formed in the read-only zone 45, and the data tracks formed in the read-write zone 44 and the read-only zone 45 are formed in a spiral pattern.

The track pitch in the read-only zone 45 is equal to the groove pitch in the read-write zone 44. Because both grooves and lands are used as data tracks in the read-write zone 44, the track pitch in the read-only zone 45 is twice that of the read-write zone 44.

Note that while the read-only zone 45 is formed on the inside circumference of the read-write zone 44 in the radial direction in FIG. 4, it is also possible on form them to the outside circumference in the radial direction.

The data format of the present embodiment is described next. The sector format of the optical disk in this embodiment is shown in FIGS. 5A–5E. The sectors in the read-write zone 44 are described below.

Figure 5:
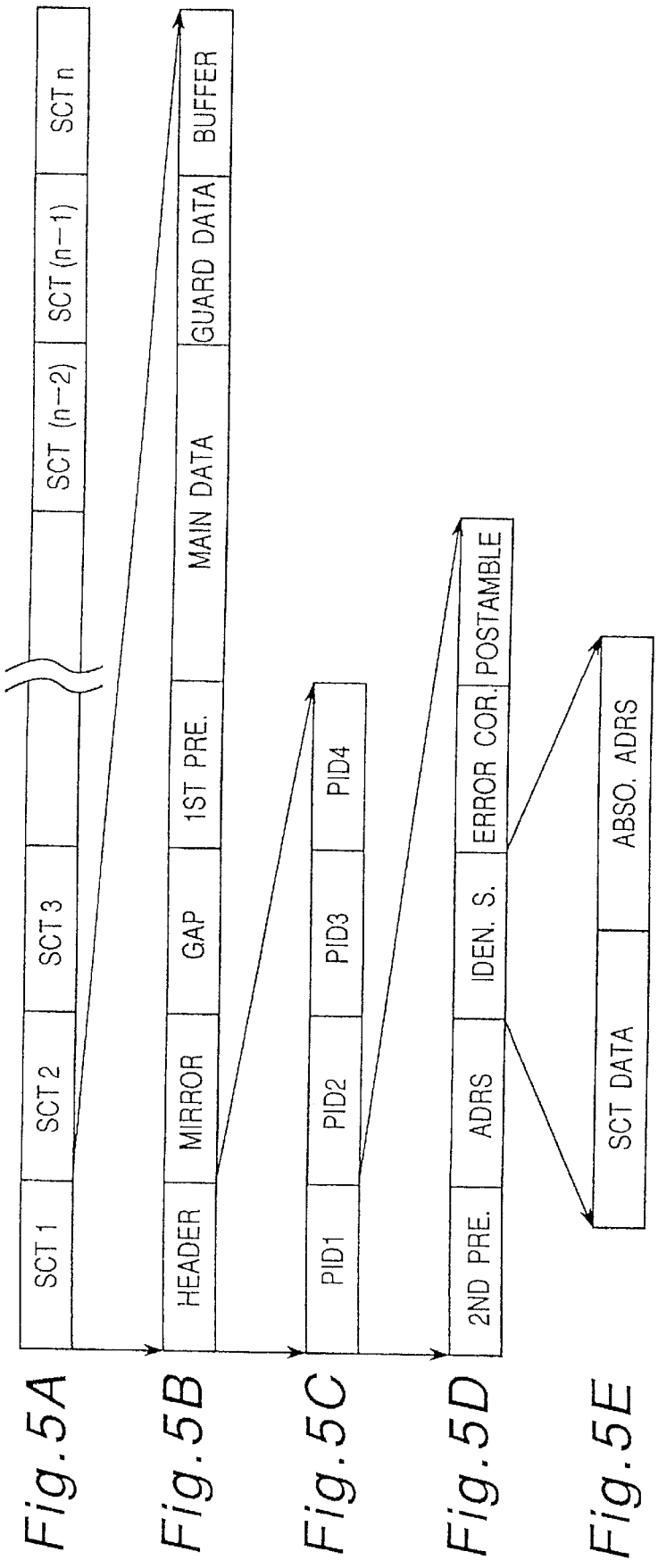
FIGS. 5A, 5B, 5C, 5D, and 5E are format diagrams used to explain the sector format of the optical disk of FIG. 4.

As in the optical disk according to the first embodiment, the data tracks are divided circumferentially into plural sectors. It is here assumed that each track is divided into n sectors as shown in FIG. 5A. As shown in FIG. 5B, each sector comprises:

1) an identification signal field (header),
2) a mirror field,
3) a gap field,
4) a first preamble field,
5) a main data signal field,
6) a guard data field, and
7) a buffer field.

The identification signal field, also known as the "header", is formed from pre-formed pit sequences. The mirror field contains no pre-formed pits or grooves, and is used to detect the amount of light reflected when the beam spot is emitted to the mirror field to control reflectance. The gap field, first preamble field, main data signal field, guard data field, and buffer field compose recording fields, and contain either grooves or lands.

The gap field is provided to gain time for signal processing between the point where the beam spot passes the identification signal and until it passes the first preamble field.

A single frequency sequence of recording pits is formed in the first preamble field to generate a synchronization clock for reproducing the data from the main data signal field.

A dummy data sequence of recording pits is recorded to the guard data field following the recording of pits to the main data signal field. The guard data field is required because of the damage caused to the recording pits after repeated writing. More specifically, repeated writing damages (degrades) the ends of the recording pits, and as writing to the same recording pits continues, this damage tends to extend upstream in the direction of beam spot travel. By providing the guard data field downstream of the main data signal field, however, this damage to the recording pits can be absorbed in the guard data field, thereby preventing the damage from extending to the main data signal field.

The buffer field is provided to assure that all recording pit sequences can be written to the area between the identification signal fields even if variation in the rotational velocity of the disk occurs during recording, causing the total length per sector of the recording pit sequences to increase.

The identification signal field is divided into four sub-fields as shown in FIG. 5C, i.e., PID1, PID2, PID3, and PID4. Each of these sub-fields is divided as shown in FIG. 5D into a second preamble area, an address marker area, an identification information area, an error correction code area, and a postamble area. The second preamble area and the postamble area contain a single frequency sequence of recording pits to generate a synchronization clock for reproducing the data from the identification signal area. The address marker area contains a recording pit sequence formed in a particular pattern to indicate that the next identification information area begins.

As shown in FIG. 5E, the identification information area includes a sector data block and an absolute address block. An error correction code is also added to prevent data read errors from the identification information area.

The sector data includes flags identifying, for example, the PID type (i.e., which of PID1–PID4 the sub-field is), zone type (lead-in, lead-out, or data recording zone), and sector type (read-only or read-write). The absolute address number includes the sector number and track number, and is therefore the same for PID1–PID4.

Figure 6:
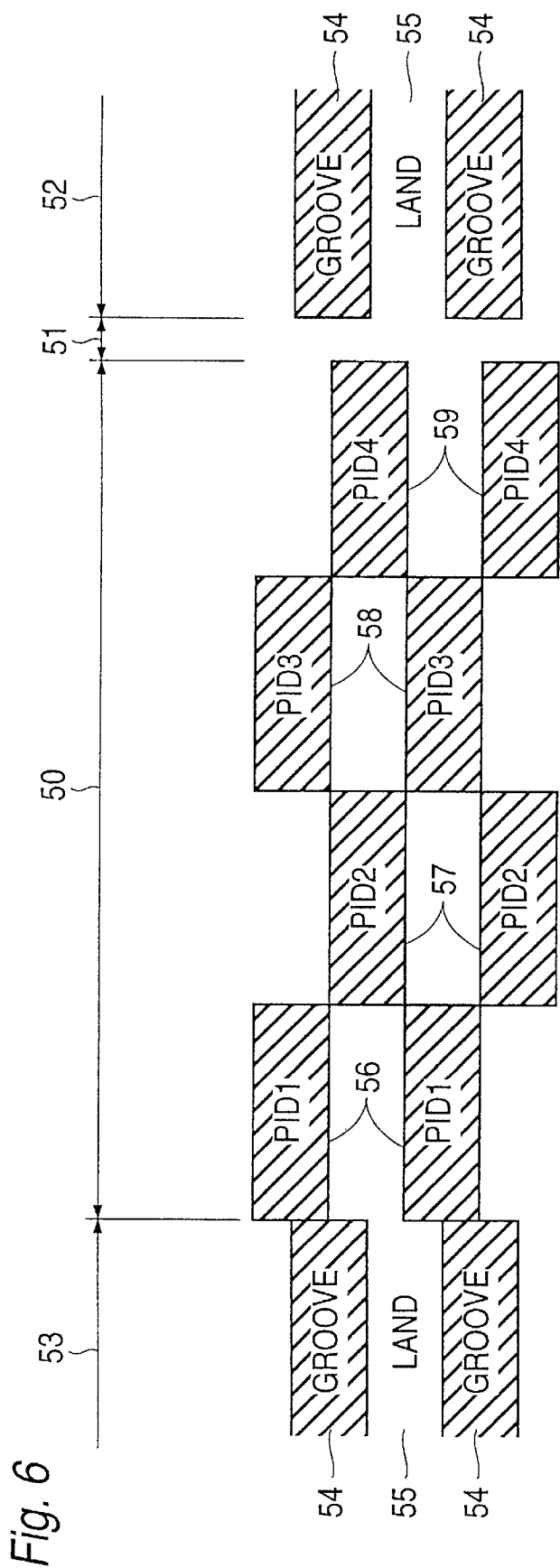
FIG. 6 is a schematic diagram indicating the pattern in the area near an identification signal field of the optical disk of FIG. 4.

The pattern of the pre-formed pit sequences in the identification signal field is described next with reference to FIG. 6, which shows the pattern of the identification signal field of an optical disk according to the present invention. In FIG. 6, the horizontal direction indicates the track direction, while the vertical direction indicates the radial direction of the disk. For easier illustration, the track direction is shown shorter in scale compared with the radial direction of the disk.

It is further assumed here that the beam spot traces from left to right as seen in the figure. Also shown are the identification signal field 50, mirror field 51, gap field 52, and buffer field 53. Also shown in the gap field 52 and buffer field 53 are the data track grooves 54 and data track lands 55.

The four sub-fields PID1 56–PID4 59 are also shown in the identification signal field 50. Each sub-field contains pre-formed pit sequences. In this example, PID1 and PID3 are offset from the center of groove to the left in the direction of beam spot travel, and PID2 and PID4 are offset to the right. Note that the center of the sub-fields is positioned near the border With the adjacent land. More specifically, the offset from the groove center of the pre-formed pit sequences forming PID1–PID4 is about ¼ groove pitch as described above.

By thus arraying the pre-formed pit sequences of the identification signal field 50 on the land-groove border, the data from the identification signal field can be detected when reading both grooves and lands. In addition, by alternating the position of the pre-formed pit sequences on both sides in the direction of beam spot travel, the data from the identification signal field can be detected with high precision even if the beam spot gets off track.

Figure 7:
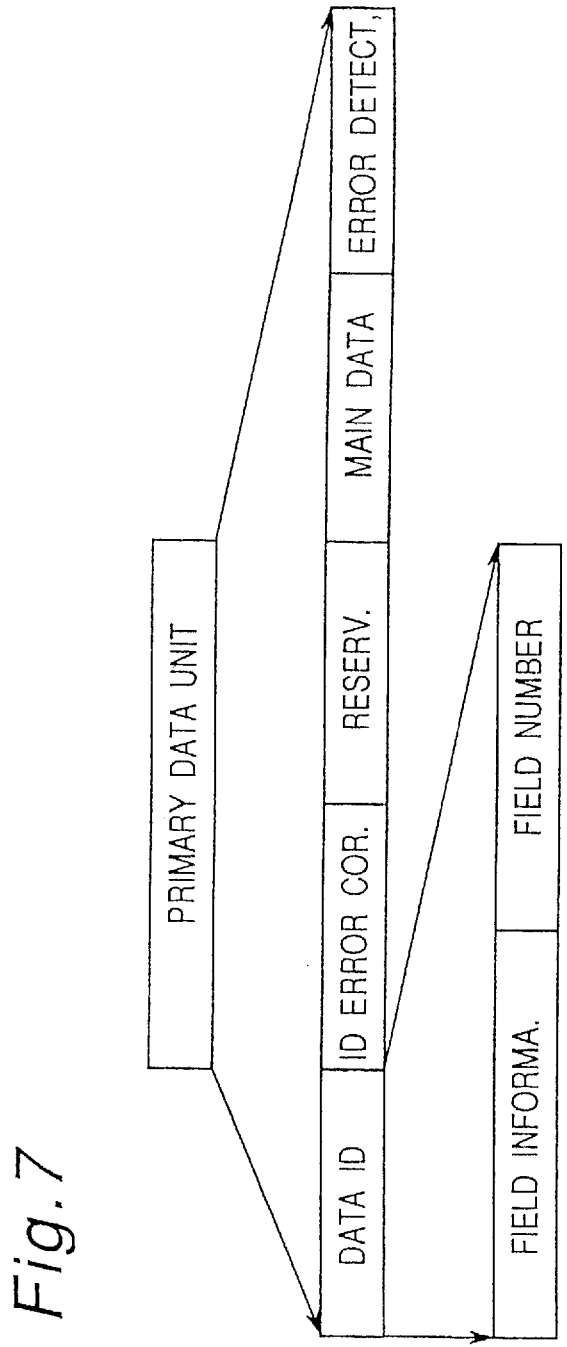
FIG. 7 is a schematic diagram indicating a primary data unit of the optical disk of FIG. 4.

The signal processing process whereby the main data signal is produced is next described with reference to FIG. 7. In each sector, for example, an error detection code is calculated for 2048 bytes of main data, data ID, data ID error correction code, and reservation information. The 2048 bytes of main data, data ID, data ID error correction code, reservation information and error detection code are defined as the primary data unit. The data contained in the primary data unit is scrambled.

The Reed-Solomon error correction coding is then applied to sixteen scrambled primary data units, which are treated as one data block, thus generating sixteen secondary data units. The data in each of the sixteen secondary data units is then processed using 8–16 modulation thereby converting 8-bit/symbol data to 16 channel bits according to specific rules. The synchronization pattern is then inserted, producing sixteen tertiary data units. These tertiary data units are then recorded to 16 sectors of the main data signal field.

The data ID includes the data field information and the data field number. The data field information contains flags identifying, for example, the track type (groove or land), zone type (lead-in, lead-out, or data recording zone), and data type (read-only or read-write). The data field number is the same as the absolute address.

The structure of the read-only zone 45 is described next.

The read-only zone 45 differs in that pre-formed pit sequences are formed at the location of the grooves in the read-write zone 44, and the pre-formed pit sequences are not formed at the location of the lands. As a result, the track pitch of the recording area in the read-only zone is twice the track pitch of the recording field in the read-write zone. Thus, the track pitch of the recording field in the read-only zone is the same as the track pitch in the control zone.

With respect to the sector format, the arrangement of the pre-formed pit sequences in the identification signal field, the rules for the sector information and the data field information, the coding and modulation of the main data in the main data signal field, and other parameters are the same as in the read-write zone.

For example, of the data field information flags in this read-only zone, it is only necessary for the flag identifying the data type to indicate read-only information, and the flag identifying the track type to indicate a groove track.

The linear recording density of the main data and the recording channel bit length in this zone are also equal to those in the read-write zone. This makes it possible to use the same reproduction signal processing circuit for both the read-write zone 44 and the read-only zone 45.

However, while the gap area and the buffer area are blank (not recorded) in the read-write zone, a pre-formed pit sequence is preferably formed in the read-only zone. This enables continuous tracking control in both zones, and thus stabilizes data reproduction.

Figure 8:
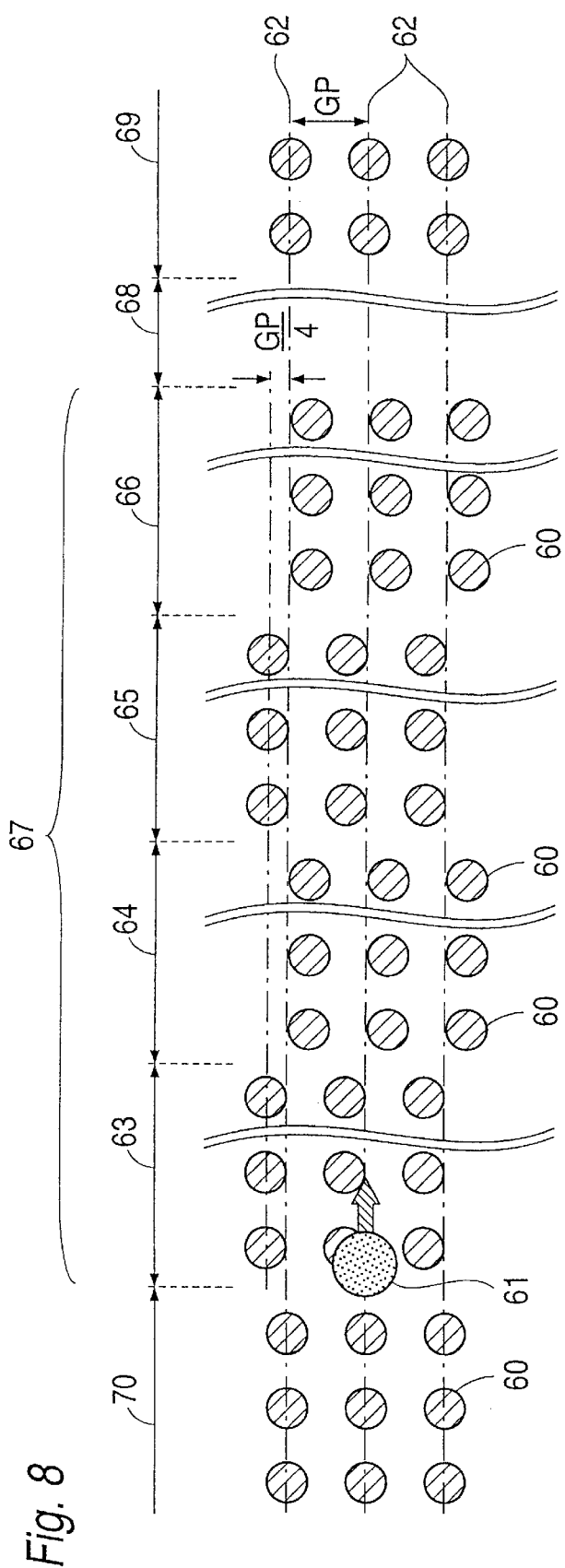
FIG. 8 is an enlarged plan view of the area near the identification signal field in a read-only zone of the optical disk of FIG. 4.
Figure 9:
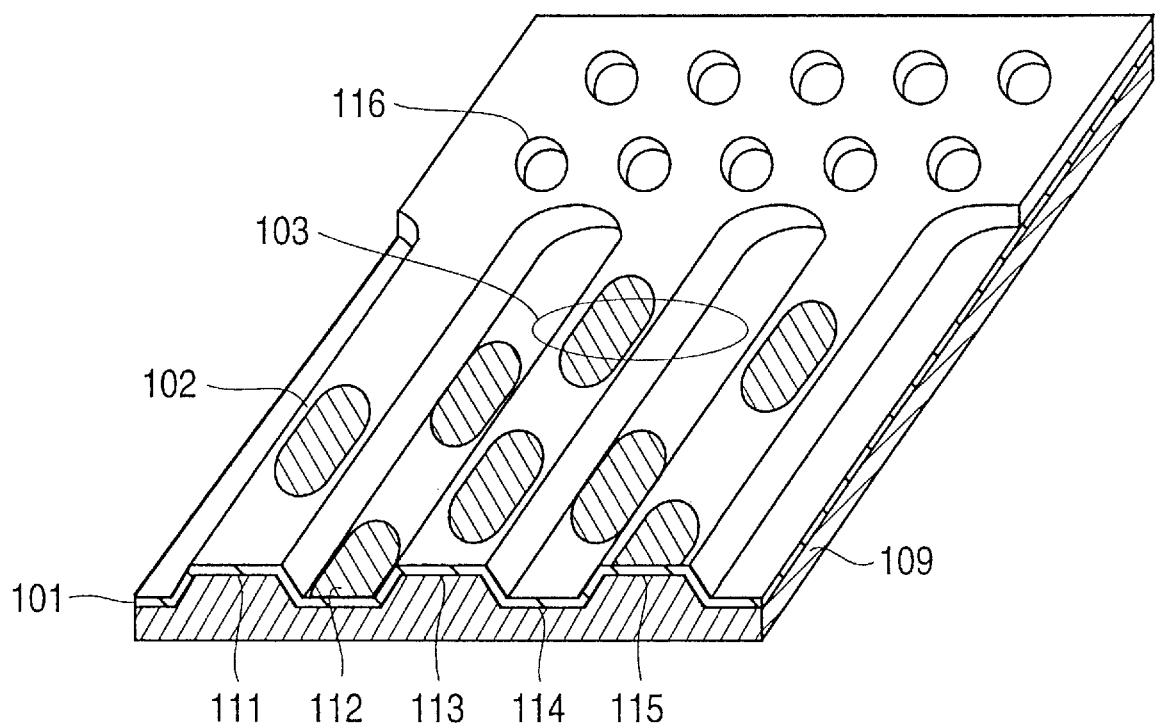
FIG. 9 is an enlarged fragmentary perspective view of a conventional optical disk.

FIG. 8 is an enlarged plan view of the identification signal field in the read-only zone of the optical disk according to the present embodiment. Note the pre-formed pits 60, beam spot 61, and track center lines 62. The beam spot 61 traces the track center line 62 in the direction of the arrow.

PID1 63, PID2 64, PID3 65, and PID4 66 are recorded by pre-formed pits 60, and constitute the identification signal field 67.

In PID1 and PID3, the pre-formed pits 60 are offset to the left in the direction of beam spot travel, and the pre-formed pits 60 in PID2 and PID4 are offset an equal amount to the right. This offset distance is about ¼ groove pitch GP.

The arrangement of the pre-formed pits 60 in the identification signal field 67 is the same as that shown in FIG. 6. Pre-formed pits and grooves are not formed in the mirror field 68, while pre-formed pits are formed in the gap field 69 and the buffer field 70.

The control zone in the lead-in zone 41 and the lead-out zone 43 has the same sector format as that of the read-only zone 45. All data in the control zone is recorded as pre-formed pits.

The main data may include, for example, the disk type, recording density, reflectance, and other media characteristics, the data transfer rate, average linear recording velocity, the recommended optical beam power, recommended recording pulse width, and other drive control data.

The track pitch in the lead-in zone 41, lead-out zone 43, and read-only zone 45 is twice the track pitch of the read-write zone 44. The arrangement of the pre-formed pits in the identification signal area is the same in each of these zones, and the track pitch is also equal.

A recording/reproducing system for the optical disk according to the present embodiment uses a groove pitch GP of 1.48 μm, a recording pit length of 0.41 μm/bit, a laser beam wavelength of 650 nm, and an objective lens aperture of 0.6.

Because both grooves and lands are used as data tracks in the read-write zone, the track pitch is 0.74 μm. In the read-only zone, however, the pre-formed pit sequences are formed on an extension of the grooves, and the track pitch is therefore 1.48 μm.

In the optical disk according to the present embodiment as described above, the track pitch in the lead-in zone 41, lead-out zone 43, and read-only zone 45 is twice the track pitch of the read-write zone 44. This provides a certain tolerance in the spacing between the pre-formed pit tracks in the radial direction, and thus makes molding the transparent substrate of the disk simpler. Signal reading precision is also improved because crosstalk from pre-formed pits on adjacent tracks is satisfactorily at a low level. By also structuring the identification signal field to be the same in each zone, signals from the identification signal field can be read using the same detection circuit in all disk zones.

The following effects are derived from the present invention described above.

Application software and other read-only data can be recorded to the read-only zone to improve the ease of use because the read-only zone is formed to either the inside circumference or outside circumference of the read-write zone, wherein user-data is recorded to both grooves and lands.

A certain tolerance is achieved in the spacing in the radial direction between the pre-formed pit tracks and the molding of the transparent substrate of the disk is made simpler, because the track pitch of the data tracks formed by the pre-formed pits in the read-only zone is the wide groove pitch and not the narrow track pitch of the data tracks in the read-write zone. Because the read-only zone can thus be easily added to an optical information recording medium comprising a read-write zone in which both grooves and lands are used as data tracks, the information signal recording capacity is great. Using the control information pre-recorded to the read-only zone, the ease of use of the device in which the optical information recording medium of the present invention is mounted can also be improved.

Furthermore, the identification signal can be reproduced when reading both groove and land data tracks even without forming the identification signal pit sequence on both grooves and lands because the pitch in the radial direction between the pit sequences in the identification signal field is equal to the groove pitch, and the pit sequences are offset in the radial direction from the track center to either the inside or outside circumference.

When the data tracks are formed in the spiral pattern, the grooves of the read-write zone and the pit sequences of the read-only zone are continuous. On the other hand, when the data tracks are formed in the concentric pattern, the distance in the radial direction between the grooves of the read-write zone and the pit sequences of the adjacent read-only zone is equal to the groove pitch. As a result, the feed pitch of the photosensitive material exposure laser can be kept constant in the master disk cutting process forming the grooves and pits for the master disk, and the read-write zone and read-only zone can be cut continuously. Accordingly, the present invention can avoid increasing the complexity of the manufacturing process for optical disks having a spiral data track.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An optical information recording medium comprising:
   a disk shaped substrate having grooves, lands, and pit sequences formed thereon;
   at least one recording film covering at least one surface of said disk shaped substrate and having a plurality of data tracks formed in a spiral or concentric pattern;
   a read-write zone, defined by a first portion of said disk shaped substrate, in which user data can be recorded to said data tracks formed from said grooves and said lands and which comprises first pit sequences; and
   a read-only zone, defined by a second portion of said disk shaped substrate which is radially adjacent to the first portion, in which said data tracks are formed from second pit sequences;
   wherein said data tracks are divided into plural sectors and wherein each sector comprises an identification signal field and a data field;
   wherein, in both said read-write zone and said read-only zone, a radial interval distance between said first pit sequences in said identification signal field and a radial interval distance between said second pit sequences in said identification signal field are both equal to a radial interval distance between said grooves, and wherein said first and second pit sequences in said identification signal field are formed radially offset from a track center line of said data tracks; and
   wherein said first and second pit sequences are detectable by a same detection circuit.

2. An optical information recording medium according to claim 1, wherein said data tracks are formed on said disk shaped substrate in the spiral pattern, and wherein said second pit sequences in said read-only zone are contiguously aligned with said grooves of said read-write zone at a border between said read-write zone and said read-only zone.

3. An optical information recording medium according to claim 1, wherein said data tracks are formed on said disk shaped substrate in the concentric pattern, and wherein a radial interval distance from said grooves of said read-write zone to said second pit sequences of said read-only zone is equal to the radial interval distance between said grooves of said read-write zone.

* * * * *